United States Patent [19]
Brewster

[11] 3,890,503
[45] June 17, 1975

[54] STIMULATED EMISSION LIGHT SOURCE PUMPED BY ELECTRON BEAM OF FIELD EMISSION INITIATED VACUUM ARC

[75] Inventor: John L. Brewster, McMinnville, Oreg.

[73] Assignee: Hewlett Packard Company, Palo Alto, Calif.

[22] Filed: May 28, 1971

[21] Appl. No.: 148,163

Related U.S. Application Data

[63] Continuation of Ser. No. 779,978, Nov. 29, 1968, abandoned.

[52] U.S. Cl. ............... 250/321; 250/327; 250/402
[51] Int. Cl. ................................... G01m 23/04
[58] Field of Search ....... 250/49.5, 84, 217 SS, 321, 250/327, 402; 331/94.5; 313/74

[56] References Cited
UNITED STATES PATENTS

| | | | |
|---|---|---|---|
| 3,173,006 | 3/1965 | Dyke et al. | 250/49.5 |
| 3,393,373 | 7/1968 | Stimlee | 331/94.5 |
| 3,482,096 | 12/1969 | Lewis et al. | 250/65 |
| 3,521,073 | 7/1970 | Brook et al. | 250/217 |

*Primary Examiner*—James W. Lawrence
*Assistant Examiner*—B. C. Anderson
*Attorney, Agent, or Firm*—Klarquist, Sparkman, Campbell, Leigh, Hall & Whinston

[57] ABSTRACT

An apparatus for generating stimulated emission light pulses of extremely high power up to 5 megawatts by electron beam pumping of laser type light emitting material, is described which employs an electron beam of extremely high current up to 6000 amperes at 450 kiloelectron-volts produced by field emission initiated vacuum arc operation of an electron tube having a field emission cathode. The field emission cathode structure has a plurality of separate needle shaped emitting elements. The laser material is mounted either on an anode inside the evacuated tube envelope or outside of the envelope adjacent an electron transparent anode window. Coherent light may be produced by causing oscillation of the light in an optical resonant cavity provided by a pair of parallel mirrors on opposite sides of the laser material.

10 Claims, 8 Drawing Figures

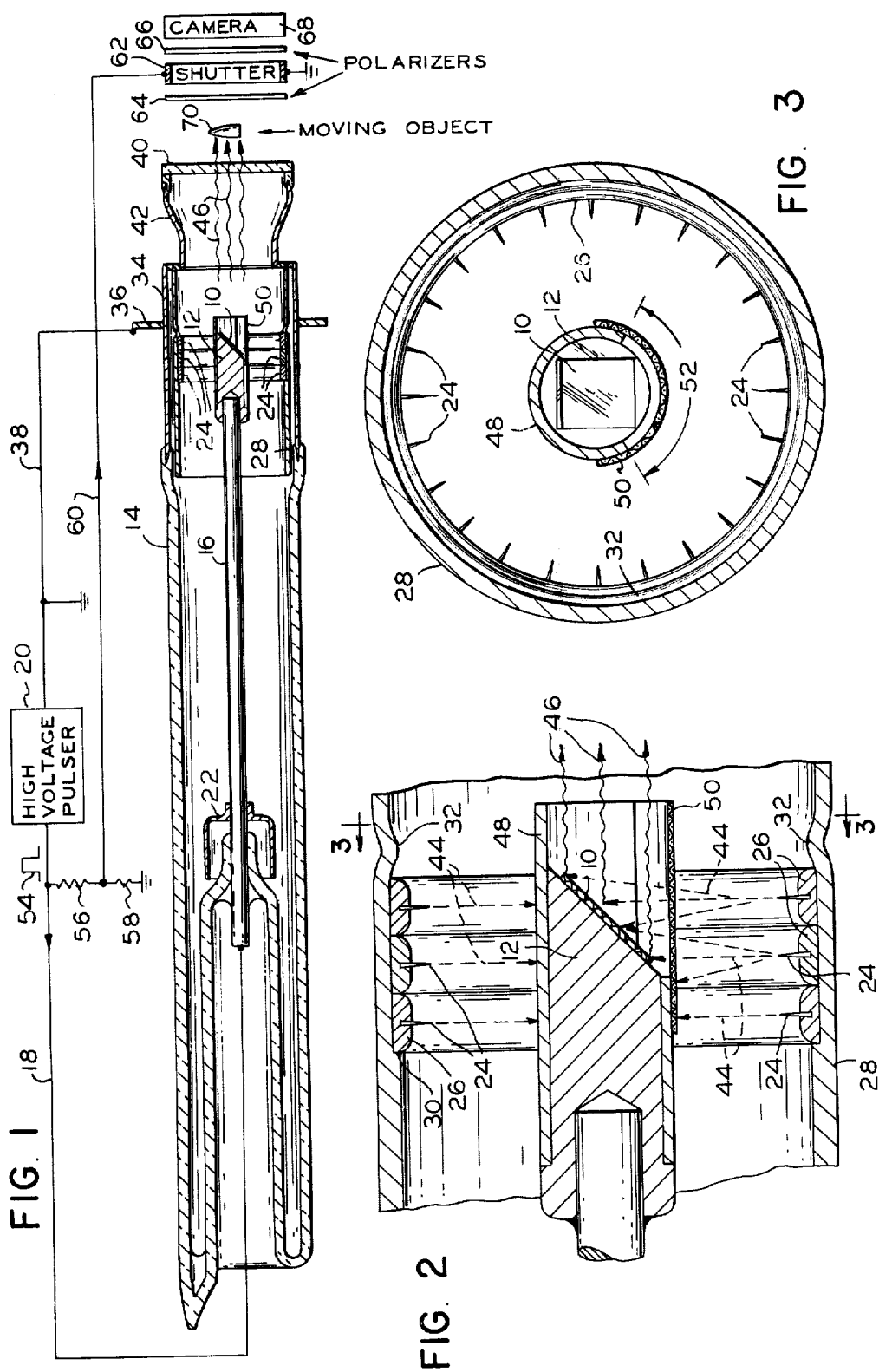

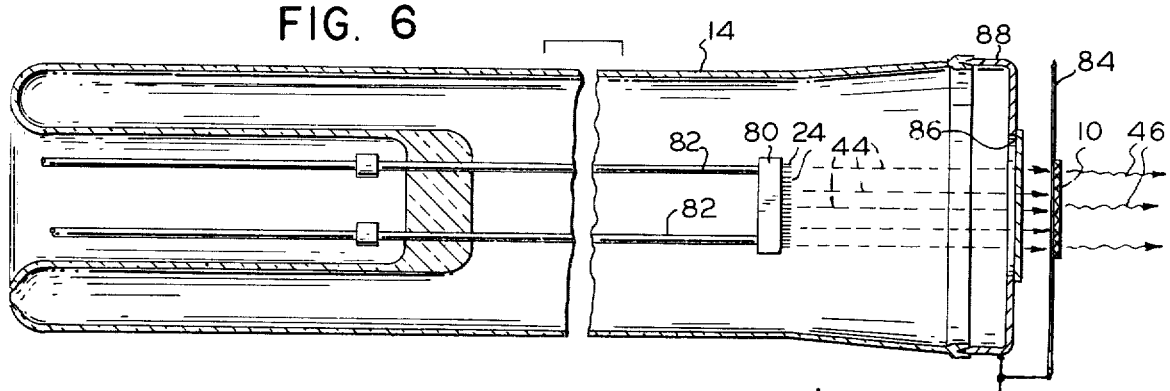
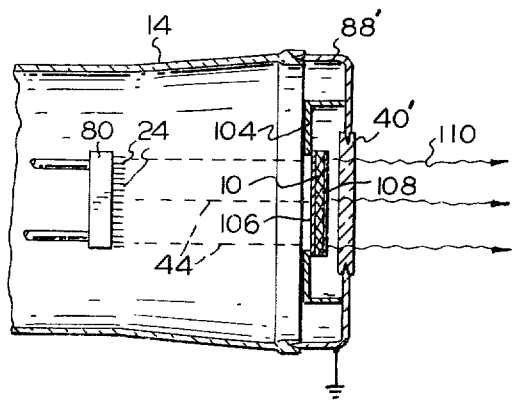
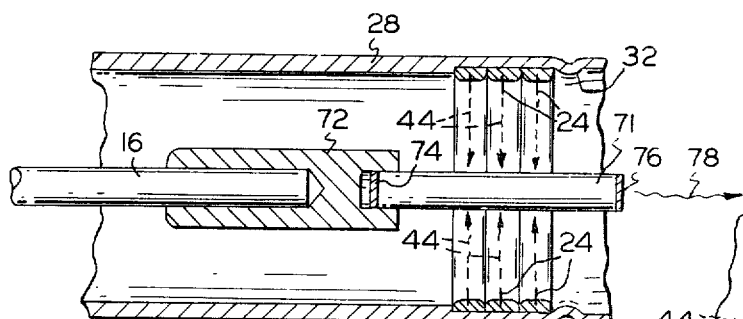
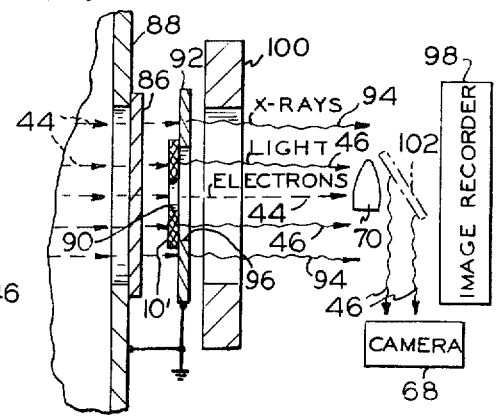
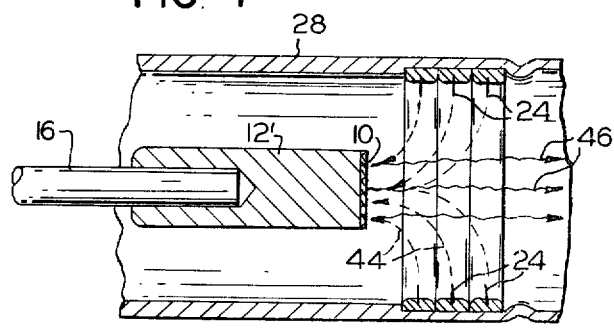

STIMULATED EMISSION LIGHT SOURCE PUMPED BY ELECTRON BEAM OF FIELD EMISSION INITIATED VACUUM ARC

This is a continuation of my previous copending U.S. Pat. application, Ser. No. 779,978, filed Nov. 29, 1968 and now abandoned.

BACKGROUND OF THE INVENTION

The subject matter of the present invention relates generally to stimulated emission light sources including laser type material pumped by a pulsed electron beam to cause population inversion, and in particular to such a light source in which the electron beam is produced by field emission initiated vacuum arc operation to provide an extremely high beam current and a light pulse of high power. The electron beam source and associated high voltage pulser may be similar to that shown in my copending U.S. patent application, Ser. No. 606,864, filed Jan. 3, 1967, which discloses a field reversal or Blumlein type pulse generator. However, a Marx surge type pulser of the type shown in U.S. Pat. No. 3,248,573 of W.P. Dyke, et al., may also be employed.

When operating the field reversal pulse generator at 260 kilovolts a 2.2 nanosecond pulse electron beam of 1100 amperes, 1 centimeter diameter and 1400 amps/cm$^2$ current density is produced. This electron beam pulse was applied to a single crystal of cadmium sulfide 6.6 mm by 1.1 mm and 125 microns thick and produced a light pulse having an energy of about 200 kilowatts peak. Higher power light pulses of about 5 megawatts peak were produced by using a plurality of small particles of cadmium sulfide crystals or zinc oxide powder, provided as a thin layer over a target area of 2.0 centimeters diameter, and pumping with an electron beam pulse of 450 kiloelectron-volts, 6000 amperes, and 2.2 nanoseconds width.

The operation of pulsed electron beam pumped lasers have been previously discussed in many literature references including the article by Marshall I. Nathan in "Proceedings of the I.E.E.E.," Vol. 54, No. 10, October 1966, pages 1276 to 1290; the article by N. G. Basov in "Science," Vol. 149, No. 3686, Aug. 20, 1965, pages 821 to 827; and the article by V. S. Vavilov and E. L. Nolle in "Soviet Physics-Solid State," Vol. 8, No. 2, February 1966, pages 421 to 427. A semiconductor laser pumped by an electron beam emitted from a heated filament cathode is shown in U.S. Pat. No. 3,393,373 of M. Stimler. Thus all of these previous lasers employed conventionally produced electron beams of much lower current on the order of 25 milliamperes and a current density of about 3 amperes per square centimeter, which were only capable of producing light pulses of low power. None of these prior art lasers employ an electron beam produced by a field emission initiated vacuum arc operation as in the present invention, which provides an electron beam of extremely high current on the order of 1000 to 6000 amperes for pumping the laser material to produce high intensity light pulses of approximately 200 kilowatts to 5 megawatts power.

There are several problems associated with electron beam pumping including damage to the laser material caused by heat at high beam currents and the crystal lattice defects produced by electron impact at high beam voltages. Also, heat causes an increase in the bandwidth of the light generated by stimulated emission. For this reason most high power lasers have been optically pumped with flash lamps or other light sources. However, electron beam pumping is much more efficient than light pumping, since the electrical energy stored in the capacitors or transmission lines of the high voltage pulser is used directly to produce the electron beam which pumps the laser material, while for light pumping it is necessary to convert the electrical energy into light by means of a flash lamp which, of course, radiates in all directions so that there is an additional loss of energy.

In addition, the electron beam source of the present invention is much more efficient than conventional electron beam sources, since it employs field emission initiated vacuum arc operation to produce much higher beam currents. To provide field emission initiated vacuum arc operation, a narrow electrical pulse of sufficiently high voltage and current is applied between the anode and the field emission cathode to cause a portion of some of a plurality of field emission cathode emitting elements to be vaporized by the field emission current flowing through such elements, to produce positive ions of cathode material within the evacuated envelope containing such cathode. These positive ions neutralize the negative space charge ordinarily surrounding such cathode, thereby enabling a much greater current to flow so that a vacuum arc is produced having currents of about 1000 amperes and higher. In order to prevent damage to the laser material and to limit bandwidth spread in the generated light due to heat at these extremely high beam currents, the electron beam is pulsed on only a very short time on the order of 2 to 10 nanoseconds. The field emission cathode is provided with a plurality of spaced, sharpened emitting elements which may be of a needle shape, so that only a few of such needles are partially vaporized during each electrical pulse to provide an electron beam source of long useful lifetime.

Another advantage of the present invention is that sufficient electron beam energy is applied to the laser material to enable it to produce a light pulse of high intensity solely by stimulated emission without employing a resonant cavity to produce optical oscillation by means of mirrors, as is done with most conventional lasers. Even though the resulting stimulated emission light is not coherent monochromatic light, as is the case of such conventional lasers, for some purposes such as photography this may be desirable, since it avoids the interference patterns produced by such coherent radiation.

A further advantage of the present invention is that the same electron source may be employed to produce a beam of combined radiation including X-rays, light, and electrons, which is extremely useful in radiography for producing and recording different radiation images simultaneously of a rapidly moving object or event in order to obtain maximum information about such object or event. Also, the present apparatus is extremely versatile since the laser material may be positioned outside of the electron beam tube adjacent an electron transparent anode window forming part of the envelope to enable the use of different laser materials, including liquids and gases in addition to monocrystalline semiconductors or other solid state materials. Also, when the external laser material is damaged, it may easily be replaced, which of course is not true when such laser material is mounted within the evacuated envelope of the electron beam tube.

It is therefore one object of the present invention to provide an improved light source of extremely high intensity which is energized by an electron beam and which has an efficient operation and long useful lifetime.

Another object of the invention is to provide an improved apparatus for the stimulated emission of light by pumping laser material with an electron beam of extremely high current which is produced by field emission initiated vacuum arc operation of an electron beam tube having a field emission cathode with a plurality of emitting elements.

A futher object of the present invention is to provide an improved electron beam pumped stimulated emission light source of high power in which an electron beam of extremely high current is pulsed on for a very short time duration to prevent undue heating of the laser material.

An additional object of the invention is to provide an improved radiographic apparatus in which a beam of combined radiation including X-rays, light, and electrons is produced by a single source of electrons, for simultaneously recording different radiation images of a rapidly moving object or event.

Another object of the present invention is to provide a pulsed laser apparatus which produces pulses of coherent light by electron beam pumped stimulated emission and optical oscillation in a resonant cavity, in which field emission initiated vacuum arc operation is employed to provide the electron beam with a high current.

Still another object of the invention is to provide an electron beam pumped stimulated emission light source in which the laser material is positioned outside the evacuated envelope of the electron beam tube to provide a more versatile apparatus in which different laser materials may be employed.

A still further object of the present invention is to provide a stimulated emission light source pumped by an electron beam produced by field emission initiated vacuum arc operation of an electron tube having a field emission cathode in the form of a plurality of separate emitting elements to provide such tube with a long useful lifetime.

BRIEF DESCRIPTION OF DRAWINGS

Other objects and advantages of the present invention will be apparent from the following detailed description of certain preferred embodiments thereof and from the attached drawings of which:

FIG. 1 is a sectional view of an electron beam tube having laser material on its anode in accordance with one embodiment of the present invention and schematically showing a high voltage pulser and photography apparatus associated therewith;

FIG. 2 is an enlarged sectional view of a portion of the tube of FIG. 1;

FIG. 3 is a sectional view taken along the line 3—3 of FIG. 2;

FIG. 4 is a sectional view of a portion of another embodiment of the present invention similar to the tube of FIG. 1;

FIG. 5 is a sectional view of a portion of a third embodiment of the tube of the present invention;

FIG. 6 is a sectional view of a fourth embodiment of the present invention in which the laser material is positioned outside the electron beam tube envelope;

FIG. 6A is an enlarged sectional view of a portion of FIG. 6 showing a modified external target structure which produces a beam of combined radiation including X-rays, light and electrons; and FIG. 7 is a sectional view of a portion of a fifth embodiment of the present invention which is similar to that of FIG. 6 except that the laser material is positioned within the evacuated envelope of the electron beam tube.

DESCRIPTION OF PREFERRED EMBODIMENTS

As shown in FIGS. 1 to 3, one embodiment of the present invention includes a thin wafer of laser light type emitting material 10, which is capable of light amplification by stimulation emission of radiation when pumped by an electron beam that produces the necessary population inversion. The wafer 10 is secured to one end of an anode 12 by soldering or "gluing" with a suitable silicone cement sold by Union Carbide under the tradename Union Carbide R-62. The anode is supported within an evacuated envelope 14 containing no appreciable amount of free gas and having a field emission cathode structure, hereafter described, mounted therein to provide an electron beam tube used for pumping the laser material. The anode 12 is attached by welding or the like to one end of an anode support rod 16 whose other end extends through the glass wall portion 14 of the envelope and is electrically connected by conductor 18 to the output of a high voltage pulser 20. A metal shield cup 22 is attached to the support rod 16 within the envelope covering the glass-to-metal seal surrounding such rod in order to act as a shield to prevent evaporated metal from the cathode or anode which is deposited on the inner surface of the envelope from covering such seal area and short circuiting the anode to the cathode.

The field emission cathode structure includes a plurality of needle shaped emitting elements 24 of tungsten or other refractory metal supported within the evacuated envelope 14 uniformly spaced around the anode 12 and directed toward such anode. The cathode needles 24 are attached to three support rings 26 of metal which are held within a metal support sleeve 28 by clamping them between an internal shoulder 30 and a crimped indentation 32, as shown in FIG. 2. The support sleeve 28 is attached at its right-hand end by welding to a cylindrical envelope portion 34 of metal which is sealed at its left end to the glass envelope portion 14. A mounting ring 36 is attached to envelope portion 34 for mounting the tube. The mounting ring 36 and the field emission cathode needles 24 may be connected to the ground terminal of the high voltage pulser 20 by conductor 38. The left end of sleeve 28 extends over the glass-to-metal seal between envelope portions 14 and 34 to prevent evaporated metal from depositing on the seal area in a similar manner to shield 22.

An optically flat, light transparent glass plate 40 is sealed to a metal tube 42 by a bead of glass deposited in a circular seal on one side of such glass plate. The tube 42 is welded to a cylinder 34 which, together with the glass portions 14 and 40, form the complete evacuated envelope. Electrons 44 emitted from the field emission cathode needles 24 bombard the laser material 10 and cause stimulated emission of light 46 from such laser material which passes through the glass window 40 out of the tube.

As shown in FIG. 2, the wafer of laser material 10, which may be a single crystal of monocrystalline semiconductor material such as cadmium sulfide, is supported on a sloped end of anode 12 at an acute angle of approximately 45° with respect to the planes of the cathode needles 24. A cylindrical shield and field corrector member 48 is secured about the anode 12 to prevent any electrons from reaching the laser material 10 except those which pass through a metal wire mesh 50 covering an aperture provided in the side of field corrector member 48 facing the laser material 10. As shown in FIG. 3, the angle 52 of the opening in the field corrector 48 through which the electrons may pass, is approximately 135°. This opening is closed by the porous mesh 50 which maintains a uniform electrical field around the anode but enables the electrons to pass through such mesh.

The high voltage pulser 20 may be a Marx surge generator of the type shown in U.S. Pat. No. 3,248,574 or a field reversal pulse generator of the type shown in my copending U.S. patent application Ser. No. 606,864. This field reversal pulse generator produces an extremely high energy output pulse, having a voltage up to 600 kilovolts and a current up to 7000 amperes, with a pulse width of 2 to 3 nanoseconds. A positive electrical pulse 54 is applied by pulser 20 to the anode 12 of the tube, such pulse being rectangular when using a Marx surge generator and being triangular when using a field reversal pulse generator.

A voltage divider including a pair of series resistors 56 and 58 connected between the output terminal of the pulser 20 and ground, may be employed to provide a trigger pulse on a conductor 60 connected between such resistors. The trigger pulse is applied to an electro-optical shutter 62, such as a Kerr cell of nitrobenzene liquid or solid state crystal of potassium dihydrogen phosphate, which changes its light refraction in response to an electrical field. The shutter 62 is positioned between a pair of polarizers 64 and 66 in front of a camera 68 or other light image recording apparatus in the path of the light rays 46. Each of the polarizers 64 and 66 acts to linearly polarize the light but their polarization axes are displaced 90° so that substantially no light reaches the camera until the electro-optical shutter 62 is energized to elliptically polarize the light. This causes a component of the light to be rotated so that it is parallel to the axis of the second polarizer 66 and is transmitted therethrough to the camera. When the shutter 62 is opened by the trigger pulse a light image of a moving object 70, such as a bullet, passing between polarizer 64 and the tube window 40 is transmitted to the camera.

As mentioned previously, the electrical pulse 54 applied by pulser 20 between the cathode emitting elements 24 and the anode 12 is sufficient to cause field emission initiated vacuum arc operation. Thus electrical pulse 54 causes the field emission of electrons from at least some of the emitting elements 24 and sufficient current flows in such emitting elements to evaporate a portion of at least some of such elements to produce positive ions of evaporated cathode material within the evacuated envelope. These positive ions effectively neutralize the negative space charge ordinarily surrounding the cathode emitting elements and produces a vacuum arc operation which greatly increases the current flowing from the cathode to the laser material 10, forming part of the anode. Due to the high current, anode material may be evaporated from field corrector 48, anode body 12, or laser material 10 which, if it were deposited on the cathode needle elements 24, might damage or contaminate such cathode elements. The positive ions of anode material are attracted toward the cathode elements due to their more negative potential. However, this is prevented by the extremely short pulse width of electrical pulse 54, which is on the order of 3 nanoseconds or less, so that the pulse terminates before the ions of anode material can reach the cathode emitting elements.

Another embodiment of the present invention is shown in FIG. 4 in which the laser material is in the form of a cylindrical rod 71 of ruby or other solid state laser material which is attached in any suitable manner, such as by welding to one end of an anode support member 72 having a cavity for receiving such rod and which is secured at its other end to the anode support rod 16. The opposite ends of the cylindrical rod 71 of laser material may be ground optically flat and parallel to one another. A pair of mirrors are formed by light reflecting coatings 74 and 76 of gold, aluminum, or silver, provided on the ends of rod 71. The right-hand reflective coating 76 is partially light transparent to enable light to be emitted therefrom and out of the tube through the glass window 40 shown in FIG. 1. It should be noted that the mirrors 74 and 76 provide an optical resonant cavity of the Fabry-Perot type, which causes oscillation of the light and further stimulated emission due to multiple internal reflections of the light within the laser material between such mirrors. As a result coherent light 78 is emitted through mirror 76. Thus the embodiment of FIG. 4 differs from that of FIG. 1 in that it is capable of complete laser action, including both light amplification by stimulated emission and light oscillation due to the resonant cavity.

Another embodiment of the invention is shown in FIG. 5, which is similar to that of FIGS. 1 to 3 previously described, except that the anode 12 is provided with a flat end extending substantially parallel to the planes of the cathode emitting elements 24 and the wafer 10 of laser material is mounted on such end in a position slightly to the left of such emitting elements. As a result, the electrons emitted from the field emission cathode elements 24 follow a curved path to the laser material 10. This embodiment is more efficient than that of FIGS. 1 to 3, since all of the electrons emitted by the cathode needles are utilized in pumping the laser material 10 to cause the stimulated emission of light.

Still another embodiment of the invention is shown in FIG. 6 in which the field emission cathode needles 24 are all supported with their points ina common plane by means of a support block 80 mounted on two cathode support rods 82 extending through the left-hand end of the glass envelope portion 14. The wafer of laser material 10 is positioned outside of the evacuated envelope and is supported on a thin electron transparent metal foil 84 adjacent an electron window portion 86 of the envelope which may both be grounded. The window portion 86 which serves as the anode of the tube is in the form of a thin electron transparent foil of metal, such as beryllium, aluminum, or one of the iron-nickel alloys discussed in my U.S. Pat. No. 3,406,304, issued Oct. 15, 1968. Electron window 86 covers an opening provided in a metal cup envelope portion 88 secured by a glass-to-metal seal to the glass envelope portion 14. The electrons 44 emitted by the field emission cathode needles 24 pass through the anode window 82 to the exterior of the tube, where they strike the wafer 10 of laser material passing through support foil 84 and cause such laser material to emit light 46 by stimulated emission. The support foil reflects the light emitted from the left side of the wafer 10 to increase the intensity of the light pulse 46 transmitted from the right side of such wafer, as well as providing a uniform electrical potential on the surface of the wafer for accelerating the electrons thereto.

It should be noted that while a single crystal of monocrystalline solid state laser material may be used as the wafer or target 10 in FIG. 6, it is also possible to employ a plurality of small particles of such laser material, such as cadmium sulfide crystals or zinc oxide powder, which is much less expensive when a target of large diameter is employed. In addition, the external target 10 may be a liquid or gas laser material contained within a suitable light transparent fluid cell. The cell may be provided with light reflecting coatings at the opposite ends thereof to provide a resonant cavity of the type discussed above with respect to FIG. 4. Thus many different types of laser materials can be employed when the electron pumped laser material is positioned outside the evacuated envelope containing the electron beam source. For example, among the many different solid state laser materials which can be employed are cadmium sulfide, gallium arsenide, indium arsenide, zinc oxide, zinc sulfide, lead sulfide, cadmium telluride, lead telluride, lead selenide, cadmium selenide, and ruby, which are all capable of stimulated emission of light when pumped by an electron beam.

As shown in FIG. 6A, the apparatus of FIG. 6 may be modified to provide a beam of combined radiation including electrons, light and X-rays, by employing a wafer 10' of laser material with a central aperture 90 through which a portion of the electron beam 44 is transmitted. The wafer 10' may be mounted on an X-ray emitting target 92 of tungsten or other suitable material of high atomic number so that a portion of the electron beam strikes the X-ray target and causes X-rays 94 to be generated. The X-ray target 92 is provided with a large central aperture 96 so that the light rays 46 emitted by the laser material pass therethrough, as do the electrons which are transmitted through aperture 90. As a result a beam of combined radiation including X-rays 94, light 46 and electrons 44 is produced which may be transmitted past a moving object 70 to a suitable image recorder 98. The recorder 98 may be provided with radiographic films of different radiation sensitivity in order to record the X-ray image, light image and electron image of the moving object 70. An X-ray collimating member 100 of lead or other shielding material may be provided to limit the spread of the X-ray 94. In addition, an electromagnetic coil (not shown) may be employed around the electron beam for forcusing such beam, if so desired. Also a light mirror 102 of electron transparent metal foil may be provided between the object 70 and the image recorder 98 with such mirror extending substantially 45° with respect to the light rays 46 to enable the light image to be recorded by a camera similar to that of FIG. 1.

A still further embodiment of the invention is shown in FIG. 7 which is very similar to that of FIG. 6 except that the wafer 10 of laser material is mounted inside the evacuated envelope 14 on a metal support cup 104 over the aperture in the bottom of the cup. The top of the support cup is welded or otherwise suitably secured to the inner surface of a metal envelope portion 88' having the light transparent glass window 40' sealed thereto. A light reflecting, electron transparent metal coating 106 is provided on the bombarded surface of the laser wafer 10 and a partially light transparent, light reflective coating 108 is provided on the right-hand surface of such wafer. The two reflective coatings 106 and 108 provide two parallel mirrors which form an optical resonant cavity of the type discussed in connection with FIG. 4. This resonant cavity results in oscillations of the stimulated emission light so that a pulse 110 of coherent light is emitted through the coating 108 and transmitted out of the envelope by way of the window 40'.

The apparatus of FIG. 1 was operated by a high voltage pulser of the Marx surge generator type shown in FIGS. 1 to 9 of U.S. Pat. No. 3,248,574 of Dyke et al, and an output pulse 54 of 150 kilovolts, 1400 amperes and a width of 10 nanoseconds was applied to the anode 12 to produce an electron beam having a current density of 260 amps/cm$^2$. When this electron beam bombarded a wafer 10 of cadmium sulfide about 0.15 cm$^2$, it was sufficient to produce by stimulated emission a light pulse of approximately 41 kilowatts peak power at an average wave length of about 5300 Angstroms with a bandwidth of 50 to 60 Angstroms. A more intense light pulse was obtained by employing the field reversal pulse generator of copending U.S. patent application Ser. No. 606,864 to apply electrical pulses between the anode and cathode in the tube of the apparatus shown in FIG. 6, so that for a pulse of 260 kilovolts, 1100 amperes and 2.2 nanoseconds width, an electron beam having a current density of 1400 amps/cm$^2$ was produced. When this electron beam bombarded a wafer of cadmium sulfide 6.6 mm by 1.1 mm and 125 microns thick, a light pulse having an energy of 3 × 10$^{+8}$ watts per cubic centimeter and a peak power of 200 kilowatts was produced for a duration of 2.2 nanoseconds at room temperature. In addition, an even higher energy light pulse of 5 megawatts peak power was produced with the same apparatus using an electron beam of 450 kiloelectronvolts, 6000 amperes and 2.2 nanoseconds pulse width to bombard a 2 centimeter diameter external target formed by a 0.02 inch thick layer of small particles of cadmium sulfide crystals or zinc oxide power.

It should be noted that the 50 to 60 Angstroms bandwidth spread in the light pulse emitted by the apparatus of FIG. 1 is believed to be primarily a result of a 50° C change in temperature of the laser material due to the heat caused by electron beam bombardment. Thus a narrow pulse width is desirable to reduce heating for several reasons, including reduction of the bandwidth spread of the light pulse, and prevention of damage to the laser material. Of course it would be possible to employ greater current densities if a suitable cooling means were provided for the laser material, such as by attaching the laser material to a cooling tube through which liquid nitrogen is flowing. Of course the power of the output light pulse increases rapidly with electron beam current density. However, for long useful life the peak voltage of the electrons beam may have to be limited to prevent impact damage to the laser material. For example electron beams applied to single crystals of cadmium sulfide may have to be limited to 260 kilovolts, since displacement of the cadmium atom is reported to take place at electron beam velocities of 290 kiloelectronvolts, which of course would damage the crystal lattice.

It will be obvious to those having ordinary skill in the art that many changes may be made in the above-described details of preferred embodiments of the present invention without departing from the spirit of the invention. Therefore the scope of the present invention should only be determined by the following claims.

I claim:

1. Apparatus for generating high intensity light pulses comprising:
    light source means including particulate light emitting material capable of producing light by stimulated emission of radiation, said light emitting material being supported on an electrically conductive support member;
    an evacuated envelope containing no appreciable free gas;
    means for mounting said light emitting material outside said envelope;
    electron pumping means including an anode, and a field emission cathode having at least one sharpened emitting element mounted within said envelope, for emitting a beam of electrons through the anode to the exterior of the envelope and for bombarding the light emitting material with said electrons to cause said material to emit light; and
    pulser means for applying narrow electrical pulses between said cathode and said anode which are each of sufficiently high voltage and high current to cause the field emission of electrons from the cathode emitting element and evaporation of a portion of said emitting element to form free ions of cathode material which produce a vacuum arc within the envelope, said vacuum arc causing an extremely high electron beam current to flow from said cathode to the particles of light emitting material so that a light pulse of high intensity is emitted by stimulated emission of radiation from said material.

2. An apparatus in accordance with claim 1 in which the field emission cathode includes a plurality of separate sharpened emitting elements which are substantially uniformly spaced from the anode.

3. An apparatus in accordance with claim 1 in which the pulser means produces electrical pulses which terminate before any ions of evaporated anode material which may be produced due to electron bombardment, can be transmitted to the cathode.

4. An apparatus in accordance with claim 2 in which the support member forms part of the anode.

5. An apparatus in accordance with claim 1 in which the light emitting material and support members are separate from the anode, and the anode is an electron transparent member which is mounted between said material and the cathode.

6. An apparatus in accordance with claim 5 in which the anode is a thin sheet of metal forming an electron window in the envelope wall and the light emitting material is mounted on the support member outside the envelope adjacent the electron window.

7. An apparatus in accordance with claim 1 in which the light emitting material is semiconductor material.

8. An apparatus in accordance with claim 2 in which the cathode emitting elements are in the form of a plurality of pointed needles.

9. An apparatus in accordance with claim 8 in which the cathode needles are supported in a plurality of annular arrays of substantially the same diameter which are concentric with the anode.

10. An apparatus in accordance with claim 6 in which the support member is a thin electron transparent foil of light reflecting metal.

* * * * *